United States Patent
Choi (10) Patent No.: US 8,651,560 B2
(45) Date of Patent: Feb. 18, 2014

(54) CAB MOUNTING APPARATUS

(75) Inventor: Kyoon Choi, Jeonju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/536,378

(22) Filed: Jun. 28, 2012

(65) Prior Publication Data

US 2013/0147235 A1 Jun. 13, 2013

(30) Foreign Application Priority Data

Dec. 12, 2011 (KR) .......................... 10-2011-0132812

(51) Int. Cl.
*B62D 33/067* (2006.01)

(52) U.S. Cl.
USPC ................... 296/190.07; 296/29; 296/190.05; 296/190.08

(58) Field of Classification Search
USPC .............. 296/29, 30, 190.01, 190.04, 190.07, 296/190.08
See application file for complete search history.

(56) References Cited

U.S. PATENT DOCUMENTS

| | | | | |
|---|---|---|---|---|
| 3,279,843 | A * | 10/1966 | Hafer et al. ............... | 296/190.08 |
| 4,978,163 | A * | 12/1990 | Savio ....................... | 296/190.08 |
| 5,562,046 | A * | 10/1996 | Fetterman et al. ........... | 105/419 |
| 6,076,884 | A * | 6/2000 | Osman ..................... | 296/190.02 |
| 6,315,351 | B1 * | 11/2001 | Mondragon Sarmiento et al. ......................... | 296/190.08 |
| 6,536,837 | B2 * | 3/2003 | Ishida et al. .............. | 296/190.08 |
| 6,948,768 | B2 * | 9/2005 | Corcoran et al. ......... | 296/190.08 |
| 7,828,371 | B2 * | 11/2010 | Murakami ............... | 296/190.03 |
| 8,100,462 | B2 * | 1/2012 | Minami et al. ........... | 296/187.08 |
| 2005/0121875 | A1 | 6/2005 | Noble | |
| 2009/0140547 | A1 | 6/2009 | Murakami | |
| 2009/0256393 | A1 * | 10/2009 | Kim ......................... | 296/190.03 |
| 2011/0266834 | A1 * | 11/2011 | Beumer .................. | 296/190.05 |

FOREIGN PATENT DOCUMENTS

| | | | | |
|---|---|---|---|---|
| EP | 1 275 575 A2 | 1/2003 | | |
| JP | 58128972 A | * | 8/1983 | ............. B62D 27/06 |
| JP | 59048272 A | * | 3/1984 | ............. B62D 27/06 |
| JP | 59067180 A | * | 4/1984 | ............. B62D 27/06 |
| JP | 10-100945 (A) | 4/1998 | | |
| JP | 2005-255095 (A) | 9/2005 | | |
| KR | 2002-0040935 A | 5/2002 | | |
| KR | 2003-0013731 A | 2/2003 | | |
| KR | 100633325 (B1) | 10/2006 | | |
| KR | 10-2009-0112045 A | 10/2009 | | |
| KR | 10-2010-0059564 A | 6/2010 | | |
| KR | 10-2011-0053851 A | 5/2011 | | |

* cited by examiner

*Primary Examiner* — Glenn Dayoan
*Assistant Examiner* — Paul Chenevert
(74) *Attorney, Agent, or Firm* — Morgan, Lewis & Bockius LLP (57) ABSTRACT

A cab mounting apparatus may include a back complete member forming a rear wall panel of a cabin of a driver's compartment and to which a member frame forming a grid structure may be added, a rear cab member coupled to a locker of an air suspension for supporting the cabin and absorbing and damping transferred vibrations, the rear cab member being coupled to the back complete member to which the member frame may be added to serve as a load input point of a load applied by the cabin, and a rear cab reinforcing member fixedly attached to the back complete member while overlapping the rear cab member and connected to an end of a rear sill member crossing a lower part of the cabin.

12 Claims, 6 Drawing Sheets

CAB MOUNTING APPARATUS

CROSS-REFERENCE TO RELATED APPLICATIONS

The present application claims priority to Korean Patent Application Number 10-2011-0132812 filed Dec. 12, 2011, the entire contents of which application is incorporated herein for all purposes by this reference.

BACKGROUND OF THE INVENTION

1. Field of the Invention

The present invention relates to a cab (cabin) mounting apparatus, and more particularly, to a cab mounting apparatus which has a simple structure and light weight while significantly increasing performance of absorbing vibrations entering a cabin due to enhancement in a strength of an input point of a back complete member against repeated road loads.

2. Description of Related Art

In general, a cabin forming a driver's compartment of a truck is coupled to a chassis frame by means of a mounting structure for absorbing and damping vibrations continuously transferred due to road loads.

Such a cabin absorbing apparatus is also referred to as a cab mounting apparatus. The cab mounting apparatus includes an air suspension having an excellent vibration absorbing and damping force and a plurality of brackets for coupling the air suspension, and generally has a construction associated with a locker mechanism for opening and closing a hinge of the cabin.

However, the cab mounting structure generally including a cabin, an air suspension, and a locker is basically vulnerable.

Figure 6:
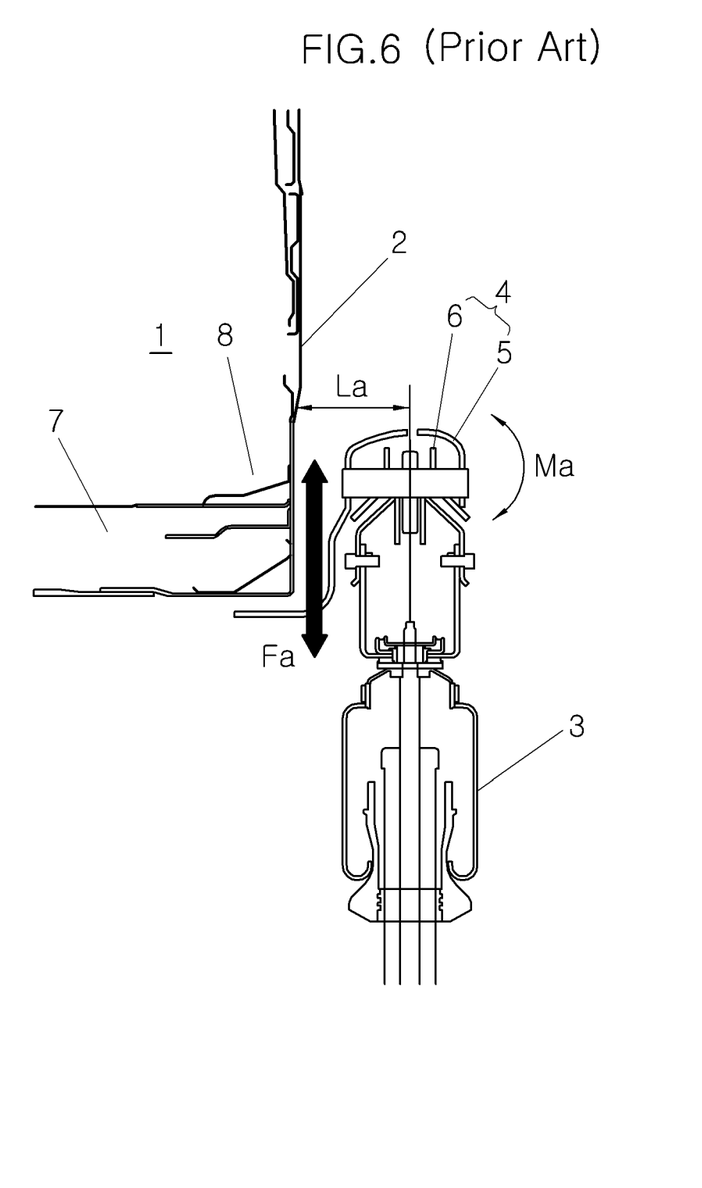
FIG. 6 is a load diagram of a cab mounting apparatus for supporting a cabin according to the related art.

As an example, FIG. 6 shows a structure where a back complete member 2 formed a rear wall of a cabin 1 and an air suspension 3 is coupled to back complete member 2 together with a locker 4 with a moment distance La for applying a bending force existing therebetween.

However, in the construction, while air suspension 3 performs an absorption function so that various loads applied downward during a driving operation of a truck cannot be directly transferred to cabin 1, locker 4 cannot but intensively receive a load applied from cabin 1.

The cab mounting structure should be reinforced separately by considering an influence of loads.

As such a reinforcing structure, a load Fa applied from cabin 1 is dispersed by using locker 4 having a six point support structure and a striker 5 operated in conjunction of a latch 6, and durability against bending of cabin 1 to which a moment Ma due to moment distance La is applied is strengthened by adding a rotation preventing/reinforcing panel 8 to an inner side of a rear seal member 7.

In particular, due to the reinforcing structure using rotation preventing/reinforcing panel 8 as mentioned above, the cab mounting structure can provide an advantage more desirable for dispersion of loads and bending strengths.

However, even in this case, the number of parts is increased due to the six point support structure of locker 4 and rotation preventing/reinforcing panel 8 and a performance enhancing effect is weak as compared to an increase in the number of parts. In addition, in particular, in a structure where moment distance La causing bending of cabin 1 is approximately 105 mm which is large, a durability reinforcing effect against bending of cabin 1 cannot but be severely insufficient.

Accordingly, the cab mounting structure having a reinforcing structure using the six point support structure of locker 4 and rotation preventing/reinforcing panel 8 cannot but have a very mere performance enhancing effect, as compared to the increase in the number of parts and the complexity of the construction.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cab mounting apparatus where a back member is added to a back complete member of a cabin and a strength of an input point of a cabin is improved by associating the back member with a locker coupled to an air suspension, making it possible to significantly increase a blocking performance of a repeated road load transferred to the cabin and achieve light weight as well as simplified structure.

In an aspect of the present invention, a cab mounting apparatus may include a back complete member forming a rear wall panel of a cabin of a driver's compartment and to which a member frame forming a grid structure is added, a rear cab member coupled to a locker of an air suspension for supporting the cabin and absorbing and damping transferred vibrations, the rear cab member being coupled to the back complete member to which the member frame is added to serve as a load input point of a load applied by the cabin, and a rear cab reinforcing member fixedly attached to the back complete member while overlapping the rear cab member and connected to an end of a rear sill member crossing a lower part of the cabin.

The rear cab member is offset from the rear cab reinforcing member and disposed directly above a striker of the locker.

The member frame may include a pair of left and right vertical members arranged perpendicular to the back complete member to maintain an interval, and a pair of upper and lower horizontal members arranged parallel to the back complete member to maintain an interval and crossing the pair of left and right vertical members.

The rear sill member is disposed perpendicular to the pair of upper and lower horizontal members.

The pair of upper and lower horizontal members are connected to a left C-pillar and a right C-pillar forming opposite widthwise sides of the cabin, respectively.

The rear cab reinforcing member is connected to ends of the pair of left and right vertical members.

The rear cab reinforcing member is located in a space formed such that the locker of the air suspension forms a moment distance with respect to the back complete member.

The rear cab reinforcing member is located to reduce a width of the space.

The rear cab member coupled to the back complete member overlaps ends of the pair of left and right vertical members.

The rear cab reinforcing member is located to reduce a width of the space.

According to the exemplary embodiments of the present invention, a vibration blocking performance of the cabin can be significantly improved through the mounting structure of the cabin by remarkably increasing a road load absorbing and damping performance through strength reinforcement of an input point of the locker coupled to the air suspension supporting the cabin.

Further, the mounting structure of the cabin can be simplified and weight and manufacturing costs thereof can be reduced by reinforcing a strength of an input point of the locker coupled to the air suspension with an associated structure of the back member of the cabin.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
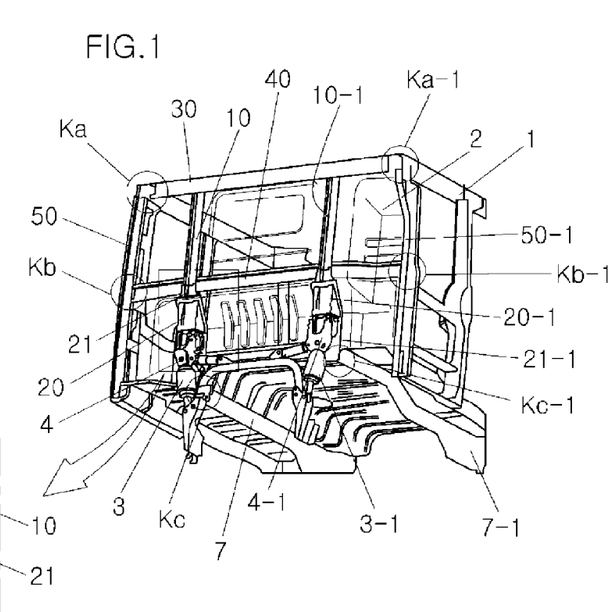
FIG. 1 is a view of a cab mounting apparatus for supporting a cabin according an exemplary embodiment of the present invention.

Referring to FIG. 1, a cab mounting apparatus includes an air suspension 3 mounted to a back complete member 2 forming a rear wall of a cabin 1 of a driver's compartment to absorb a road impact transferred toward cabin 1, a locker 4 coupled to an upper part of air suspension 3 to realize an opening/closing operation of cabin 1, and a member frame for dispersing a load applied toward locker 4 and lessening a bending force applied to back complete member 2 with a reduced moment distance.

Air suspension 3 corresponds to an air suspension generally applied to a cab mounting structure.

Locker 4 includes a striker 5 operated in conjunction with a latch 6 so that cabin 1 is converted into a locking state or is released from the locking state, and thus has a construction of a locker generally applied to a cab mounting structure.

The member frame includes a pair of left and right vertical members 10 and 10-1 located at a pair of lockers 4 respectively on the left and right sides of back complete member 2 with an interval being interposed therebetween, a pair of rear cab members 20 and 20-1 coupled to the pair of left and right vertical members 10 and 10-1 to be coupled to the pair of lockers 4, a pair of rear cab reinforcing members 21 and 21-1 extending from the pair of left and right vertical members 10 and 10-1, respectively, and at least one horizontal member connected to left and right C-pillars 50 and 50-1 of cabin 1 across the pair of left and right vertical members 10 and 10-1.

The pair of rear cab reinforcing members 21 and 21-1 form connecting parts Kc and Kc-1, and connecting parts Kc and Kc-1 are coupled to a pair of rear sill members 7 and 7-1 arranged across a lower side of cabin 1, respectively.

Thus, rear sill member 7 receives upward and downward vibrations applied by cabin 1 through rear cab reinforcing members 21 and 21-1, so that the upward and downward vibrations applied by cabin 1 can be dispersed to rear sill member 7.

The horizontal member includes an upper horizontal member 30 connected to left and right C-pillars 50 and 50-1 of cabin 1 across the pair of left and right vertical members 10 and 10-1, and a lower horizontal member 40 connected to left and right C-pillars 50 and 50-1 of cabin 1 across the pair of left and right vertical members 10 and 10-1 below upper horizontal member 30.

That is, an end of upper horizontal member 30 is fixed to a connecting part Ka coupled to left C-pillar 50, and an opposite end thereof is fixed to a connecting part Ka-1 coupled to right C-pillar 50-1.

An end of lower horizontal member 40 is fixed to a connecting part Kb coupled to left C-pillar 50, and an opposite end thereof is fixed to a connecting part Kb-1 coupled to right C-pillar 50-1.

Figure 2:
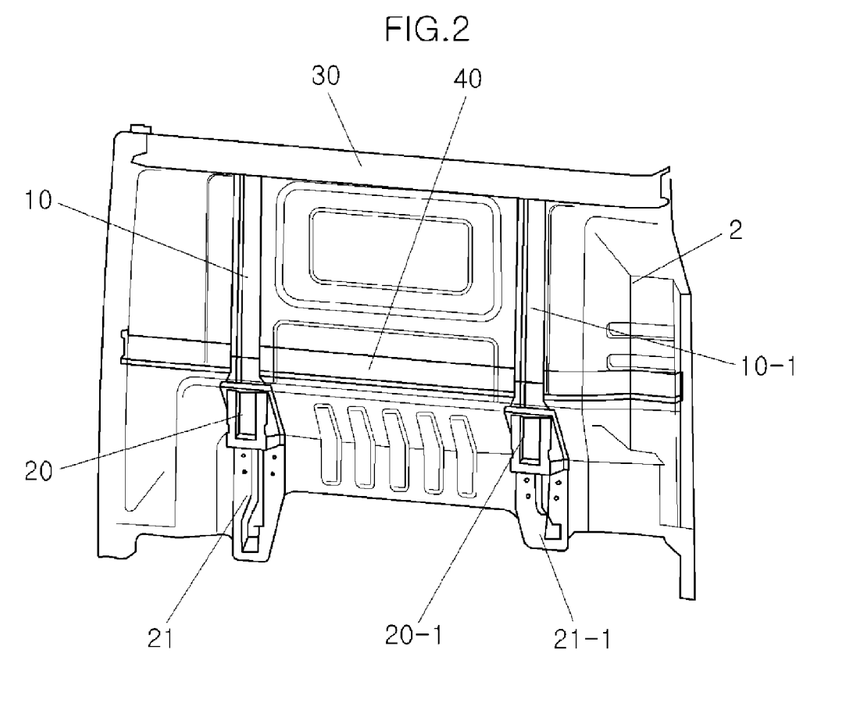
FIG. 2 is a back member layout of the cab mounting apparatus according to an exemplary embodiment of the present invention.

Referring to the layout of the back member of FIG. 2, the pair of left and right vertical members 10 and 10-1 and the pair of upper and lower horizontal members 30 and 40 are added to back complete member 2 so as to cross each other to form a grid.

Accordingly, since back complete member 2 can use strength of a grid-structured member itself, a durability reinforcing effect can be obtained.

The pair of rear cab members 20 and 20-1 extend from the pair of left and right vertical members 10 and 10-1, respectively and are coupled to the pair of rear cab reinforcing members 21 and 21-1 fixedly attached to back complete member 2.

Thus, the strengths of input points for coupling parts of rear cab members 20 and 20-1 and locker 4 of air suspension 3 can be significantly reinforced.

Figure 3:
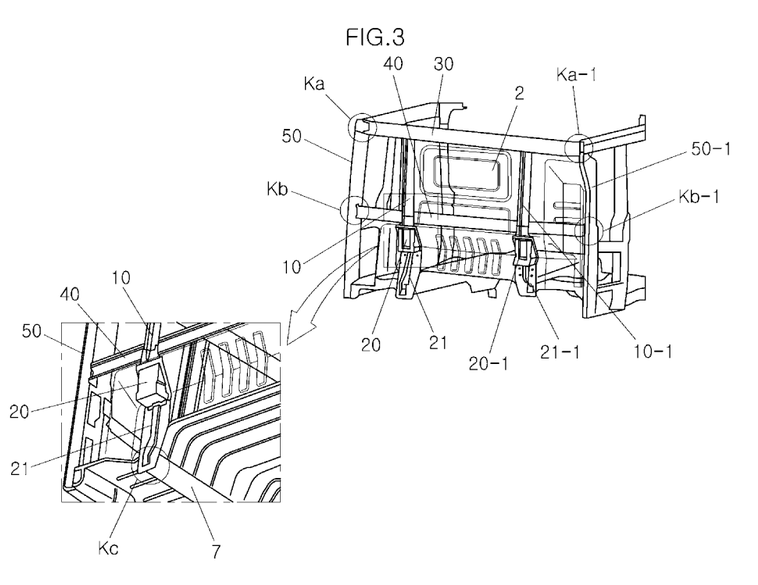
FIG. 3 is an overall layout of members of the cab mounting apparatus according an exemplary embodiment of the present invention.

Referring to the overall layout of FIG. 3, respective ends of left and right vertical members 10 and 10-1 and upper and lower horizontal members 30 and 40 are fixed to connecting parts Ka, Ka-1, Kb, and Kb-1 connecting left and right C-pillars 50 and 50-1.

Thus, back complete member 2 can achieve a strength reinforcing effect due to the grid structure of left and right vertical members 10 and 10-1 and upper and lower horizontal members 30 and 40 and also achieve a strength reinforcing effect due to a fixing structure connected to left and right C-pillars 50 and 50-1, thereby achieving a remarkably reinforced durability.

Rear cab reinforcing members 21 and 21-1 extend from left and right vertical members 10 and 10-1 to be fixedly attached to back complete member 2, and are fixed by means of connecting parts Kc and Kc-1 connecting respective ends thereof to rear sill member 7 and 7-1 arranged under cabin 1.

Thus, rear cab reinforcing members 21 and 21-1 can achieve a fixing force reinforcing effect using back complete member 2 and also achieve a strength reinforcing effect due to the fixing structure connected to rear sill member 7 and 7-1, thereby achieving a remarkably reinforced load supporting force.

Thus, rear cab members 20 and 20-1 connected to locker 4 of air suspension 3 are coupled to rear cab reinforcing members 21 and 21-1, and as rear cab members 20 and 20-1 uses the strength reinforcing effect of rear cab reinforcing members 21 and 21-1 itself, a strength of an input point can be significantly improved.

Figure 4:
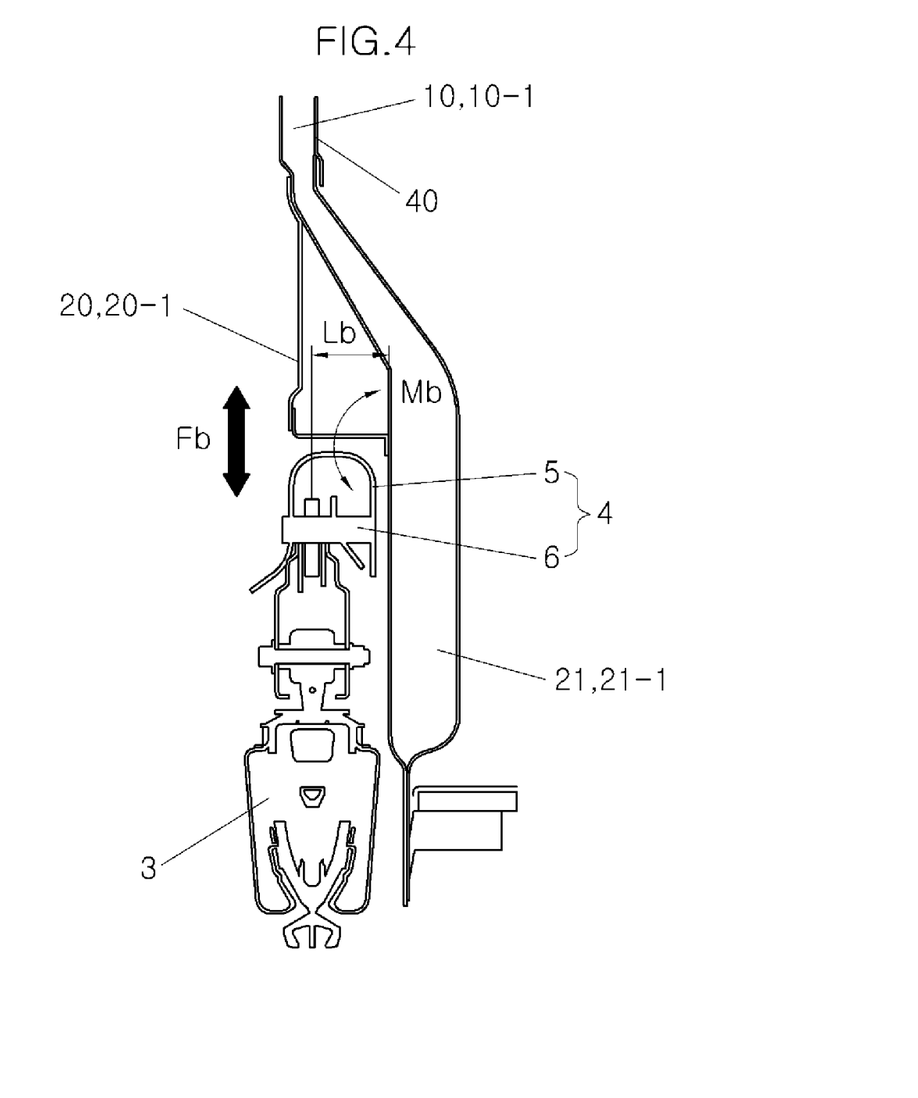
FIG. 4 is a sectional layout of the cab mounting apparatus according to an exemplary embodiment of the present invention.

Referring to the sectional layout for the cab mounting apparatus of FIG. 4, it can be seen that locker 4 of air suspension 3 and the sectional layout of rear cab members 20 and 20-1 and rear cab reinforcing members 21 and 21-1 are further attached to each other, and moment distance Lb may become shorter than the above-mentioned moment distance La (see FIG. 6).

The remarkably shortened moment distance Lb reduces the magnitude of moment Ma, and a bending durability of cabin 1 can be significantly reinforced by reducing a bending influence applied to cabin 1.

Actually, when actually applied to a vehicle, it was proved that moment Mb due to moment distance Lb is rarely generated and strength is improved to a level approximately 3.5 times of an existing one.

The cab mounting apparatus significantly improves strength of an input point in rear cab members 20 and 20-1

This is caused by using a strength reinforcing effect of rear cab reinforcing members 21 and 21-1 itself and dispersing upward and downward vibrations Fb of cabin 1 applied to rear cab members 20 and 20-1 to rear sill member 7 through rear cab reinforcing members 21 and 21-1.

Figure 5:
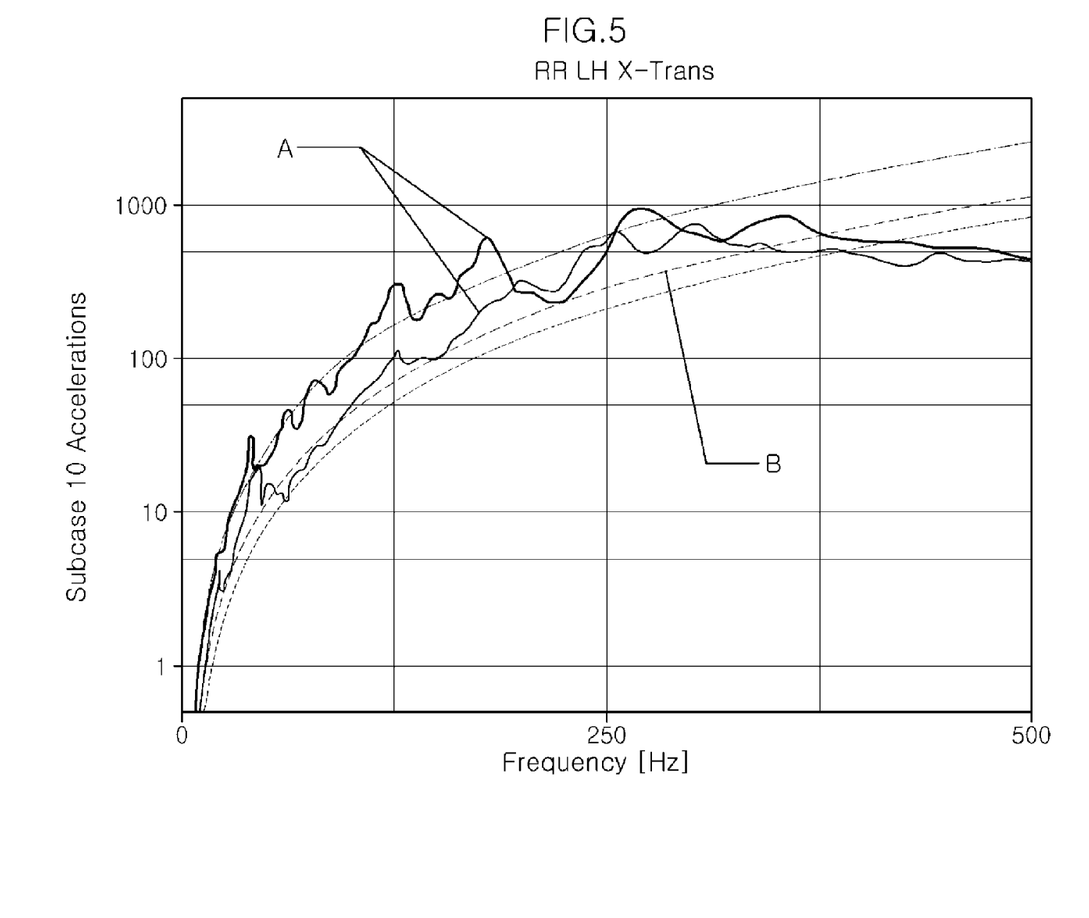
FIG. 5 is a front/rear vibration diagram of the cab mounting apparatus according an exemplary embodiment of the present invention.

Referring to FIG. 5, front/rear vibration diagram A is obtained by the layout of the cab mounting apparatus of FIG. 6 and it can be seen that shattering may be caused by severe vibration amplitudes, whereas front/rear vibration diagram B is obtained by the layout of the cab mounting apparatus of the exemplary embodiment of the present invention and it can be seen that shattering is rarely generated due to few vibration amplitudes.

The result of front/rear vibration diagram B is obtained by reducing moment distance Lb from approximately 105 mm to approximately 73 mm by around 30% in the layout of the cab mounting apparatus according to the exemplary embodiment of the present invention.

As mentioned above, the cab mounting apparatus according to the exemplary embodiment of the present invention can significantly reinforce a durable strength of back complete member 2 due to vertical and horizontal members 10, 10-1, 30, and 40 forming a grid structure, and also significantly reinforce the strengths of the input points of rear cab members 20 and 20-1 coupled to locker 4 of air suspension 3 due to rear cab reinforcing members 21 and 21-1 connected to rear sill member 7.

In particular, since moment distance Lb formed between back complete member 2 and locker 4 of air suspension 3 is also reduced to be short so that moment Mb is rarely generated, cabin 1 is rarely influenced by bending, thereby making it possible to remarkably reinforce the bending durability and vibration performance of cabin 1 and reduce an overall weight of cabin 1.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cab mounting apparatus, comprising:
   a back complete member forming a rear wall panel of a cabin of a driver's compartment and to which a member frame forming a grid structure is added;
   a rear cab member coupled to a locker of a suspension device for supporting the cabin and absorbing and damping transferred vibrations, the rear cab member being coupled to the back complete member to which the member frame is added to serve as a load input point of a load applied by the cabin;
   a rear cab reinforcing member fixedly attached to the back complete member while overlapping the rear cab member and connected to an end of a rear sill member crossing a lower part of the cabin; and
   a pair of left and right vertical members extending along the back complete member spaced from one another;
   wherein the rear cab reinforcing member is connected to the left and right vertical members and the rear sill member to form a grid structure.

2. The cab mounting apparatus as defined in claim 1, wherein the rear cab member is offset from the rear cab reinforcing member and disposed directly above a striker of the locker.

3. The cab mounting apparatus as defined in claim 1, wherein the member frame includes:
   a pair of upper and lower horizontal members extending along the back complete member spaced from one another and crossing the pair of left and right vertical members.

4. The cab mounting apparatus as defined in claim 3, wherein the rear sill member is disposed perpendicular to the pair of upper and lower horizontal members.

5. The cab mounting apparatus as defined in claim 3, wherein the pair of upper and lower horizontal members are connected to a left C-pillar and a right C-pillar forming opposite widthwise sides of the cabin, respectively.

6. The cab mounting apparatus as defined in claim 5, wherein the rear cab reinforcing member is connected to ends of the pair of left and right vertical members.

7. The cab mounting apparatus as defined in claim 6, wherein the rear cab reinforcing member is located in a space formed such that the locker of the suspension device forms a moment distance with respect to the back complete member.

8. The cab mounting apparatus as defined in claim 7, wherein the rear cab reinforcing member is located to reduce a width of the space.

9. The cab mounting apparatus as defined in claim 5, wherein the rear cab member coupled to the back complete member overlaps ends of the pair of left and right vertical members.

10. The cab mounting apparatus as defined in claim 9, wherein the rear cab reinforcing member is connected to ends of the pair of left and right vertical members.

11. The cab mounting apparatus as defined in claim 10, wherein the rear cab reinforcing member is located in a space formed such that the locker of the suspension device forms a moment distance with respect to the back complete member.

12. The cab mounting apparatus as defined in claim 11, wherein the rear cab reinforcing member is located to reduce a width of the space.

\* \* \* \* \*